United States Patent
Vitte et al.

(10) Patent No.: US 8,892,433 B2
(45) Date of Patent: Nov. 18, 2014

(54) METHOD OF SELECTING ONE MICROPHONE FROM TWO OR MORE MICROPHONES, FOR A SPEECH PROCESSOR SYSTEM SUCH AS A "HANDS-FREE" TELEPHONE DEVICE OPERATING IN A NOISY ENVIRONMENT

(75) Inventors: Guillaume Vitte, Paris (FR); Alexandre Briot, Paris (FR); Guillaume Pinto, Paris (FR)

(73) Assignee: Parrot, Paris (FR)

(*) Notice: Subject to any disclaimer, the term of this patent is extended or adjusted under 35 U.S.C. 154(b) by 406 days.

(21) Appl. No.: 13/320,106

(22) PCT Filed: May 7, 2010

(86) PCT No.: PCT/FR2010/050888
§ 371 (c)(1),
(2), (4) Date: Feb. 2, 2012

(87) PCT Pub. No.: WO2010/130928
PCT Pub. Date: Nov. 18, 2010

(65) Prior Publication Data
US 2012/0284023 A1    Nov. 8, 2012

(30) Foreign Application Priority Data
May 14, 2009   (FR) .................................... 09 53176

(51) Int. Cl.
*G10L 21/02*   (2013.01)
*H04M 9/08*   (2006.01)

(52) U.S. Cl.
CPC ..................................... *H04M 9/082* (2013.01)
USPC .......................................... 704/226; 704/233

(58) Field of Classification Search
CPC ................. G10L 21/0208; G10L 2021/02165; G10L 2021/02166; G10L 25/78; G10L 21/02
USPC .................................................. 704/226, 233
See application file for complete search history.

(56) References Cited

U.S. PATENT DOCUMENTS

| | | | |
|---|---|---|---|
| 6,246,773 B1* | 6/2001 | Eastty | 381/71.11 |
| 6,505,057 B1* | 1/2003 | Finn et al. | 455/569.2 |
| 8,135,148 B2* | 3/2012 | Jin et al. | 381/108 |
| 8,447,590 B2* | 5/2013 | Ishibashi et al. | 704/200 |
| 8,560,309 B2* | 10/2013 | Pance et al. | 704/231 |
| 2001/0048740 A1* | 12/2001 | Zhang et al. | 379/406.01 |
| 2004/0258255 A1* | 12/2004 | Zhang et al. | 381/92 |

(Continued)

FOREIGN PATENT DOCUMENTS

| | | |
|---|---|---|
| EP | 1564980 A1 | 8/2005 |
| EP | 1581026 A1 | 9/2005 |
| WO | 2007099222 A1 | 9/2007 |

*Primary Examiner* — Jakieda Jackson
(74) *Attorney, Agent, or Firm* — Haverstock & Owens LLP

(57) ABSTRACT

The method comprises the steps of: digitizing sound signals picked up simultaneously by two microphones (N, M); executing a short-term Fourier transform on the signals ($x_n(t)$, $x_m(t)$) picked up on the two channels so as to produce a succession of frames in a series of frequency bands; applying an algorithm for calculating a speech-presence confidence index on each channel, in particular a probability a speech that is present; selecting one of the two microphones by applying a decision rule to the successive frames of each of the channels, which rule is a function both of a channel selection criterion and of a speech-presence confidence index; and implementing speech processing on the sound signal picked up by the one microphone that is selected.

10 Claims, 1 Drawing Sheet

(56) References Cited

U.S. PATENT DOCUMENTS

| | | |
|---|---|---|
| 2007/0021958 A1* | 1/2007 | Visser et al. .................. 704/226 |
| 2007/0218959 A1 | 9/2007 | Kim |
| 2008/0101635 A1* | 5/2008 | Dijkstra et al. ............... 381/315 |
| 2009/0281800 A1* | 11/2009 | LeBlanc et al. ............... 704/224 |
| 2011/0026734 A1* | 2/2011 | Hetherington et al. ...... 381/94.1 |
| 2013/0010982 A1* | 1/2013 | Elko et al. .................... 381/94.2 |

* cited by examiner

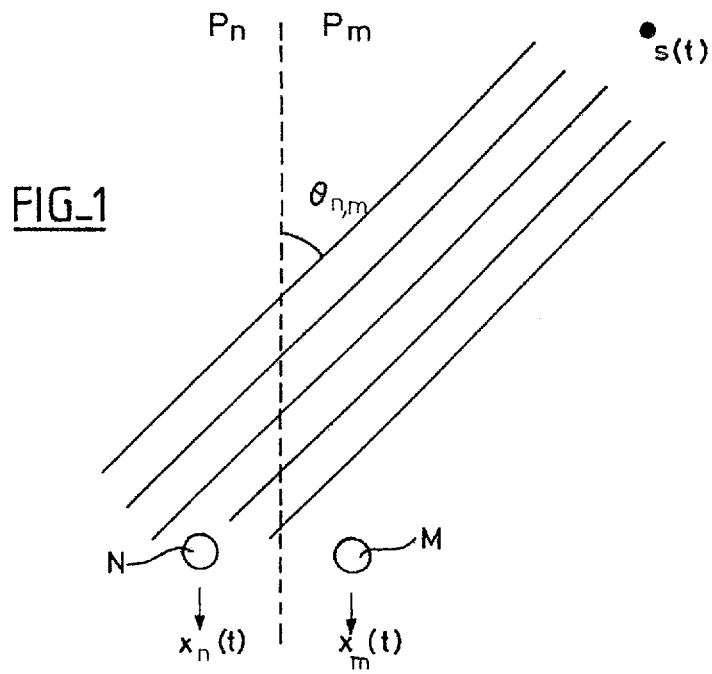
FIG_1
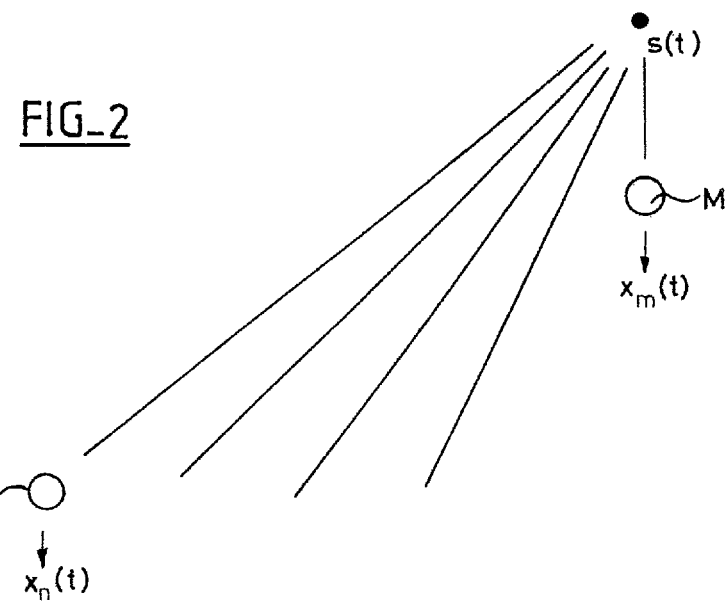
FIG_2

METHOD OF SELECTING ONE MICROPHONE FROM TWO OR MORE MICROPHONES, FOR A SPEECH PROCESSOR SYSTEM SUCH AS A "HANDS-FREE" TELEPHONE DEVICE OPERATING IN A NOISY ENVIRONMENT

The invention relates to processing speech in a noisy environment.

The invention relates particularly, but in non-limiting manner, to processing speech signals picked up by "hands-free" type devices for motor vehicles.

Such appliances have a sensitive microphone that picks up not only the user's voice, but also the surrounding noise, which noise constitutes a disturbing element that, under certain circumstances, can create sound disturbance as to make the speaker's speech incomprehensible. The same applies if it is desired to implement voice recognition techniques, since it is very difficult to perform shape recognition on words that are drowned in a high level of noise.

This difficulty associated with ambient noise is particularly constraining for "hands-free" devices for motor vehicles. In particular, the large distance between the microphone and the speaker gives rise to a high relative level of noise that makes it difficult to extract the useful signal drowned in the noise. Furthermore, the very noisy environment that is typical of a car presents spectral characteristics that are not steady, i.e. that vary in unpredictable manner as a function of driving conditions: driving over a deformed roadway or cobblestones, car radio in operation, etc.

Some such devices provide for using a plurality of microphones, generally two microphones, and taking the mean of the signals they pick up, or performing other operations that are more complex, in order to obtain a signal with a lower level of disturbances. In particular, a so-called "beamforming" technique implements an array of microphones so as to use relatively simple software means to create directivity that enables the signal-to-noise ratio to be improved. Nevertheless, that technique assumes that the position of the speaker relative to the microphones is more or less constant, which is generally true for a telephone conversation in a car with the driver (but not with the passenger).

In general, in all so-called "beamforming" techniques, in order to obtain effectiveness that is more or less satisfactory, it is necessary to have a large number of microphones (at least five), and they are not available in most industrial applications.

That is why it is more common to use techniques that involve only one microphone.

Under such circumstances, it is preferable to use a unidirectional microphone providing a better signal/noise ratio, however it does so in a single direction that does not vary, and that is thus applicable for only one speaker position.

By way of example, such a "hands-free" device for a motor vehicle is described in WO 2008/049982 A1 (Parrot SA), which describes various echo cancellation and suppression techniques, noise reduction techniques, etc., for application to a signal that is picked up by a single microphone that picks up the sound signal from the near speaker together with noise.

The invention relates to such a speech processor system that makes use of only one microphone (and that is therefore different from systems of the "beamforming" type, etc.), but in which the (one) microphone is selected automatically from two distinct microphones, or from more microphones in a microphone array.

The object of the invention is to propose a method that makes it possible to determine amongst those two or more microphones, which is the microphone that is picking up the speech signal with the least noise, so as to subsequently perform various kinds of processing (de-noising, echo canceling, etc.) on the signal picked up by the microphone as determined in this way, and referred to below as the "reference microphone".

Various techniques are known for selecting one microphone from a plurality, e.g. in a teleconferencing device such as that described in EP 1 564 980 A1, by having a plurality of microphones pointing towards the various participants installed around the device. That document describes dynamic selection means suitable for distinguishing between speech and noise and for activating, at any given instant, only that one of the microphones that is situated facing the active speaker.

With a "hands-free" type device for a motor vehicle as mentioned above, the most frequent (although non-limiting) situation is that in which the system has two microphones. Several configurations can then be envisaged.

A first configuration consists in providing two directional microphones that are located quite close to each other, e.g. at the two ends of the front face of a car radio located in the middle portion of the vehicle cabin, one of the microphones having the main lobe of its directivity pattern pointing towards the driver and the other microphone towards the passenger.

Another configuration consists in providing two spaced-apart microphones, e.g. located high up, at the extreme corners of the vehicle ceiling, or at both ends of the dashboard.

In both configurations, the more effective microphone that is to be selected is usually the microphone that is pointing towards the active speaker (either the driver or the passenger). However it can sometimes be necessary to take account of special situations: thus, if a motorcycle is overtaking the vehicle on the left, it may be preferable to select the right-hand microphone, even if the speaker is the driver on the left.

The object of the invention is to propose a robust system for automatically selecting the microphone in a system having two microphones (the invention naturally being suitable for being applied to switching to one microphone from more than two microphones, by applying the same algorithms on each possible pair of microphones).

The underlying idea is that regardless of the configuration of the microphones (close together or spaced apart), it is possible to distinguish between the signals picked up by each of the microphones by making the assumption that the signal picked up by one of the two microphones is better than the other, i.e. that one of the two microphones is better placed for picking up the wanted signal with fewer disturbances or losses than the other microphone.

One of the principles on which the invention is based consists in deriving, for this purpose, a speech-presence confidence index for each of the two channels corresponding to the two microphones, and in selecting one or the other of the two microphones in application of a decision rule that is a function, amongst other things, of said speech-presence confidence index.

This principle makes it possible to increase substantially the robustness with which the reference microphone is selected over time, as a function of results that are calculated continuously, with the selection being adapted to the way various biases vary and to variations in the sound environment.

The above-mentioned objects are achieved by a method of the general type disclosed in above-mentioned EP 1 564 980 A1, i.e. a method of selecting a microphone from two or more microphones for a multi-microphone speech processing system operating in a noisy environment, each of the microphones being associated with a respective channel and being suitable for picking up a noisy sound signal having a useful speech component from a main sound signal source mixed with a diffuse noise component. The method comprises the steps of:

digitizing the sound signals picked up simultaneously by the two microphones;

executing a transformation of the signals picked up on the two channels in such a manner as to produce a succession of frames in a series of frequency bands;

applying an algorithm for calculating a speech-presence index for each channel;

selecting one of the two microphones by applying a decision rule to the successive frames of each of the channels, which rule is a function both of a channel selection criterion and of said speech-presence index; and implementing speech processing on the basis of the sound signal picked up by the one selected microphone.

In a manner characteristic of the invention:

the transformation of the signals picked up on the two channels is a short-term Fourier transform;

the speech-presence index is a confidence index calculated for each frequency band of each frame; and the selection criterion is calculated in frequency bands on only those frequency bands for which the confidence index is greater than a first given threshold.

According to various subsidiary implementation characteristics:

the method further includes a step of eliminating, from the successive frames, frequency bands that are situated beneath a second given threshold;

the speech-presence confidence index is a probability that speech is present;

the speech-presence confidence index is calculated for each frequency band, and said selection is performed providing the index is greater than a third given threshold, in a number of frequency bands that is greater than a fourth given threshold;

the multi-microphone speech processor system is a system having close-together directional microphones, and the channel selection criterion is an angle criterion based on comparing respective phases of the signals picked up simultaneously on the two channels, the microphone for selection being the microphone on which the signal is picked up sooner than the other;

the multi-microphone speech processor system is a system having spaced-apart directional or non-directional microphones, and the channel selection criterion is an energy criterion based on comparing respective signal-to-noise ratio values of the signals picked up simultaneously on the two channels, the microphone for selection being the microphone for which the signal-to-noise ratio is greater than the other;

the selection of one of the two microphones is performed conditionally only when the decision rule is satisfied on a number of successive frames that is greater than a fifth given threshold; and if it is decided to select one of the microphones, the selection is performed progressively over a given transition time lapse by applying increasing gain to the channel of the microphone that is to be selected and decreasing gain to the channel of the microphone that is to be deselected.

There follows a description of an embodiment of the device of the invention given with reference to the accompanying drawings in which the same references are used to designate elements that are functionally similar.

FIG. 1 is a diagram of a configuration with two close-together microphones.

FIG. 2 is a diagram of a configuration with two spaced-apart microphones.

The principle on which the invention is based is described below together with its application to the two above-mentioned configurations (microphones close together and microphones spaced apart).

The basic assumption is that one of the signals picked up by the two microphones is, a priori, better than the other, i.e. it contains fewer disturbances or losses than the other, compared with the useful speech signal.

The object of the invention is to determine among the two signals that have been picked up, which is the better for having speech processing (de-noising, echo canceling, etc.) applied subsequently to that selected signal alone, referred to below as the "reference signal" or the "signal from the reference microphone".

Both microphones pick up a signal emitted by a main signal source s, and the difference in position between the microphones gives rise to various phase shifts and amplitude variations relative to the signal emitted by s. More precisely, as a function of time instant t, the following applies:

$$x_n(t) = a_n \times s(t - \tau_n) + v_n(t)$$

where $a_n$ is the amplitude attenuation due to the loss of energy over the sound path between the position of the sound source s and the microphone of index n, $\tau_n$ is the phase shift between the signal as emitted and the signal as received by the microphone n, and the additional term $v_n$ represents the value of the diffuse noise field at the location where the microphone n is to be found.

Writing the short-term Fourier transforms of the above signals using uppercase letters, the equation becomes:

$$x_n(k,l) = d_n(k) \times S(k,l) + V_n(k,l)$$

where k and l designate respectively the frequency band and the frame under consideration, with:

$$d_n(k) = a_n e^{-i2\pi f_k \tau_n}$$

where $f_k$ is the center frequency of frequency band of index k.

It should be observed that the coefficients $d_n(k)$ depend solely on the geometrical data of the system and not on the nature of the emitted signal s. Indeed, these coefficients are characteristics of the geometrical configuration under consideration.

Two situations are considered below, specifically:

a configuration with microphones that are close together, where it is considered that the distance between the two microphones is small compared with the distance between the source and the microphones (a more precise mathematical definition of this condition is given below); and a configuration in which the microphones are spaced apart, where it is considered that the distance between the source and one of the two microphones is relatively greater than the distance between the source and the other microphone.

Close-Together Microphone Configuration

This configuration, shown diagrammatically in FIG. 1, is to be found for example when both microphones are located in the front face of a car radio, itself placed in a central position in the vehicle dashboard. The distance between the microphones is typically of the order of 5 centimeters (cm), and at most 10 cm.

In this configuration, it is most advantageous to use directional microphones with different orientations. If the two microphones are referenced N and M, then the microphone M should ideally have its directivity pattern with its main lobe covering the half-plane Pm, while the microphone N should have its directivity pattern occupying the other half-plane Pn.

In the configuration under consideration here, with microphones that are close together, it is possible to make the approximation that the sound source emits a plane wave (it suffices for the source to be a few centimeters away from the microphones), and it is merely the propagation direction of the wave in question that is to be evaluated (in three dimensions or in projection onto a particular plane). Only the phase difference information between the two microphones is then of use, and the following formula is used:

$$\tau_n - \tau_m = \frac{1}{2\pi f_k} \arg(E(\overline{X}_m(k, \ell) X_n(k, \ell)))$$

where E is the mathematical expectation that may be evaluated by calculating the mean value of the product under consideration over a plurality of frames.

The assumption that the microphones are "close together" may be expressed more precisely as a condition on the distance $l_{n,m}$ between the two microphones, it being necessary for the phase shift $\Delta\phi$ between $x_n(t)$ and $x_m(t)$ to lie in the interval $[-\pi; \pi]$ in order to avoid confusion between phase lag and phase lead, i.e.:

$$|\Delta\varphi| = \left|\frac{2\pi f_k \ell_{n,m}}{c} \cdot \sin\theta_{n,m}\right| < \frac{2\pi f_k \ell_{n,m}}{c} < \pi$$

Nevertheless, if the distance D is greater, it is still possible to use the same algorithm, but while omitting higher frequencies from the frequencies analyzed. The maximum frequency is then expressed as $$f_{max} < \frac{c}{2\ell_{n,m}}$$

It suffices to determine which one of the two half-planes $P_n$ and $P_m$ contains the source. The problem then reduces to studying the sign of the expression $\arg(E(\overline{X}_m(k, 1) X_n(k, 1)))$:

sign[θ$_{n,m}$(k,l)]=sign[τ$_n$−τ$_m$]=sign[arg(E($\overline{X}_m(k,l)X_n(k,l)$))]

In theory, for a given frame, the angles $\theta_{n,m}$(k, 1) should be the same for all frequencies. In practice, the noise proponent gives rise to small variations. The sign of:

$$\tau_n - \tau_m = \frac{1}{2\pi f_k} \arg(E(\overline{X}_m(k, \ell) X_n(k, \ell)))$$

is therefore calculated for different frequencies, and an overall decision is taken as a function of the distribution of the results per frequency, by calculating the sum of the unweighted individual decisions.

In practice, various kinds of phase noise are involved and for small values of $\theta_{n,m}$(k, 1) the determination of the sign of $\theta_{n,m}$(k, 1) may be biased. Nevertheless, the following formula:

$$\frac{2\pi f_k \ell_{n,m}}{c}(\tau_n - \tau_m) + \varphi_{noise} = \arg(E(\overline{X}_m(k, \ell) X_n(k, \ell)))$$

reveals the fact that the noise term has less impact at higher frequencies. Consequently, calculations performed on low values of k are less reliable, in particular if the angle of incidence of the signal is small. It is therefore desirable to use weighting with a higher confidence index at higher frequencies.

Since an average is not being used here, but only a count of signs over a set of frequencies, it is possible to exclude the lowest frequencies from the calculation (frequencies for which $k \leq k_{min}$). To sum up, the selection rule is as follows, where NumPlusThreshold is a predetermined threshold:

for the frame l:

M is the better microphone if:

card($E_+$)_card($E_-$)>NumPlusThreshold

N is the better microphone if:

card($E_-$)_card($E_+$)>NumPlusThreshold else no decision with:

$$\begin{cases} E_+ = \{k \ t.q. \ k > k_{min} \text{ and } \arg(E(\overline{X}_m(k, \ell) X_n(k, \ell))) > 0\} \\ E_- = \{k \ t.q. \ k > k_{min} \text{ and } \arg(E(\overline{X}_m(k, \ell) X_n(k, \ell))) < 0\} \end{cases}$$

In other words, instead of measuring the angle of incidence of the signal coming from the source on the basis of the relative phase shifts between the signals picked up by the microphones, it is the sign of the above expression that is determined for each band in a subset of frequency bands, and those signs are counted. If the count shows a significant majority (as determined by the threshold NumPlusThreshold) in favor of one of the microphones N or M, than that microphone is considered as being the reference microphone.

Configuration with Two Spaced-Apart Microphones

This configuration is shown diagrammatically in FIG. 2.

The distance between the microphones in this example is about 1 meter (m) to 1.5 m, e.g. corresponding to an installation in which the two microphones are placed on either side of a vehicle cabin ceiling.

In this configuration, phase-shift information is no longer usable since the distance between the two microphones is too great (insufficient correlation and confusion between phase lag and phase lead).

In contrast, the terms $a_n$ and $a_m$ for signal attenuation are much more pertinent. In the overall signal picked up by one of the microphones, the contribution from the source, i.e. the useful signal, will be reduced in a manner corresponding to how much further the microphone is from said source.

In this configuration, there is no longer any need to use directional microphones in order to distinguish between the two sound pickups. This distinction is intrinsic to the positions of the microphones relative to the source: for example, in a car, one of the microphones will be much closer to the driver, and the other to the passenger. Noise will therefore be much more attenuated in the signal picked up by one of the microphones than in the signal picked up by the other.

Under such conditions, the basic principle consists in using the value of the signal/noise ratio as the selection criterion. The selection criterion is thus no longer an angle criterion, as with two close-together microphones, but an energy criterion.

The decision is taken relative to a threshold ΔSNRThreshold on the same principle as for the angled criterion in the close-together microphone configuration. The decision rule is as follows:

for a frame l:

M is the better microphone if:

SNR$_m$(l)−SNR$_n$(l)>ΔSNRThreshold

N is the better microphone if:

SNR$_n$(l)−SNR$_m$(l)>ΔSNRThreshold else no decision with:

$$SNR_m(\ell) = \frac{\sum_k X_m(k, \ell)}{\sum_k \hat{V}_m(k, \ell)} \text{ and } SNR_n(\ell) = \frac{\sum_k X_n(k, \ell)}{\sum_k \hat{V}_n(k, \ell)}$$

where $\hat{V}_m(k, l)$ and $\hat{V}_n(k, l)$ designate the estimated noise components as picked up respectively by the microphones M and N.

Making Reference Microphone Selection More Robust

The techniques for automatically selecting the reference microphone are subject to various biases associated with noise and with calculation approximations.

In order to avoid too great a number of wrong detections, the present invention proposes accompanying those automatic selection techniques by an overall mechanism that provides very great robustness against diffuse noise, and that is effective regardless of the processing technique subsequently applied to the selected reference signal (cross-correlation, summing, . . . ).

Essentially, the invention proposes deriving a confidence index for the presence of speech in each of the signals picked up by the microphones, and for conditioning selection of the reference microphone on some minimum level of the speech-presence confidence index.

There is no point in seeking to select one of the microphones instead of the other if there is no useful signal from the source (no speech from the speaker). It is therefore appropriate to apply the above-described selection criteria only on frames for which it is likely that the source signal is present.

The confidence index may in particular be a probability that speech is present, calculated in the manner described in WO 2007/099222 A1 (Parrot SA), for example, which describes a de-noising method involving the calculation of such a probability, which method is derived from a technique described by I. Cohen and B. Berdugo in "Speech enhancement for non-stationary noise environments", Signal Processing, Elsevier, Vol. 81, pp. 2403-2418, 2001.

Calculating a probability for the presence of speech (or any other comparable known technique), as described in the context of noise reduction processing in which the source signal corresponds to a speech signal, may be applied to the present invention in order to increase the robustness of the algorithm for selecting the reference microphone (and thus before any de-noising processing).

As happens frequently in the field of de-noising a speech signal that is mixed with a noise component, the idea is not to identify exactly which components of which frames have speech that is present or absence, but rather to provide a confidence index lying in the range 0 to 1, where a value of 1 means that speech is certainly absent (according to the algorithm), whereas a value of 0 indicates the contrary. By its very nature, this index can be thought of as the a priori probability that speech is absent, i.e. the probability that speech is absent on a given frequency component in the frame under consideration.

The probability that speech is present $P_{PresProb}$ can thus be used as an additional criterion for conditioning the selection of one microphone or the other, by comparing it with a predetermined threshold PresProbThreshold: thus, in order to apply the selection rule, use is made only of the set F(l) of "pertinent frequencies" in such a manner that for each frame l of the signal the following applies:

$$F(l) = \{k \ t.q. \ P_{PresProb}(k,l) > \text{PresProbThreshold}\}$$

If this set made up of frequencies contained in the useful signal is too small (i.e. if card(F(l))<MinSize), then no decision is taken for the current frame l. In the same manner as with the thresholds NumPlusThreshold or ΔSNRThreshold, this criterion serves to put a limit on and to control the number of erroneous decisions.

Otherwise, (i.e. if card(F(l))<MinSize), the calculation for selecting the better microphone is performed on the basis only of pertinent frequencies, i.e. the frequencies for which the source content is zero (no speech) are not taken into account when making the decision.

The two above-explained rules for selecting the better microphone for a frame can thus be rewritten as follows.

In the first configuration (close-together microphones):
for frame l
M is the better microphone if:

card($E_+$)_card($E_-$)>NumPlusThreshold and if:

card(F(l))<MinSize

N is the better microphone if:

card($E_-$)_card($E_+$)>NumPlusThreshold and if:

card(F(l))<MinSize else no decision
with:

$$\begin{cases} E_+ = \{k \in F(\ell) t.q. \ k > k_{min} \text{ and } \arg(E(\overline{X}_m(k, \ell)X_n(k, \ell))) > 0\} \\ E_- = \{k \in F(\ell) t.q. \ k > k_{min} \text{ and } \arg(E(\overline{X}_m(k, \ell)X_n(k, \ell))) < 0\} \end{cases}$$

In the second configuration (spaced-apart microphones):
for frame l
M is the better microphone if:

$SNR_m(l)-SNR_n(l)$>ΔSNRThreshold and if:

card(F(l))<MinSize

N is the better microphone if:

$SNR_n(l)-SNR_m(l)$>ΔSNRThreshold and if:

card(F(l))<MinSize else no decision
with $$SNR_m(\ell) = \frac{\sum_{k \in F(\ell)} X_m(k, \ell)}{\sum_{k \in F(\ell)} \hat{V}_m(k, \ell)} \text{ and } SNR_n(\ell) = \frac{\sum_{k \in F(\ell)} X_n(k, \ell)}{\sum_{k \in F(\ell)} \hat{V}_n(k, \ell)}$$

Change of Reference Microphone

One of the advantages of the system of the invention is to be able to follow movements of the source, and thus to change the reference microphone over time when the source moves, or when two sources are emitting in alternation (e.g. the driver and the passenger of the vehicle).

In order to have a system that is stable, it is nevertheless important to avoid changing the microphone too suddenly or too often.

For this purpose, the invention also proposes making the stages during which the reference microphone is changed over more robust.

In order to avoid untimely switchover, it is possible for the condition for switching from one reference microphone to the other (M instead of N, or vice versa), to depend on a certain number of stability rules, such as:

the reference microphone is changed only if several consecutive iteratives of the algorithm for selecting the better microphone per frame lead to a decision for changing the reference microphone; and/or microphone changeover is not sudden, but takes place progressively, over a plurality of consecutive frames by applying varying gain, increasing on one of the microphones and decreasing on the other, so as to obtain a progressive "fade" effect.

The invention claimed is:

1. A method of selecting a microphone from two or more microphones for a multi-microphone speech processing system operating in a noisy environment, each of the microphones being associated with a respective channel and being suitable for picking up a noisy sound signal having a useful speech component from a main sound signal source (s(t)) mixed with a diffuse noise component, the method comprising the following steps:

digitizing the sound signals picked up simultaneously by the two microphones (N, M);

transforming the signals ($x_n(t)$, $x_m(t)$) picked up on the two channels in such a manner as to produce a succession of frames in a series of frequency bands;

applying an algorithm for calculating a speech-presence index of each channel;

selecting one of the two microphones by applying a decision rule to the successive frames of each of the channels, which rule is a function both of a channel selection criterion and of said speech-presence index, and eliminating, from the successive frames, frequency bands that are situated beneath a second given threshold; and implementing speech processing on the basis of the sound signal picked up by the one selected microphone;

which method is characterized in that:

said transformation of the signals ($x_n(t)$, $x_m(t)$) picked up on the two channels is a short-term Fourier transform;

said speech-presence index is a confidence index calculated for each frequency band of each frame; and said selection criterion is calculated in frequency bands on only those frequency bands for which the confidence index is greater than a first given threshold, wherein:

said multi-microphone speech processor system is a system having close-together directional microphones; and said channel selection criterion is an angle criterion based on comparing respective phases of the signals picked up simultaneously on the two channels, the microphone for selection being the microphone on which the signal is picked up sooner than the other.

2. The method of claim 1, wherein the speech-presence confidence index is a probability that speech is present.

3. The method of claim 1, wherein the speech-presence confidence index is calculated for each frequency band, and said selection is performed providing the index is greater than a third given threshold, in a number of frequency bands that is greater than a fourth given threshold.

4. The method of claim 1, wherein the selection of one of the two microphones is performed conditionally only when said decision rule is satisfied on a number of successive frames that is greater than a fifth given threshold.

5. The method of claim 1, wherein, if it is decided to select one of the microphones, said selection is performed progressively over a given transition time lapse by applying increasing gain to the channel of the microphone that is to be selected and decreasing gain to the channel of the microphone that is to be deselected.

6. A method of selecting a microphone from two or more microphones for a multi-microphone speech processing system operating in a noisy environment, each of the microphones being associated with a respective channel and being suitable for picking up a noisy sound signal having a useful speech component from a main sound signal source (s(t)) mixed with a diffuse noise component, the method comprising the following steps:

digitizing the sound signals picked up simultaneously by the two microphones (N, M);

transforming the signals ($x_n(t)$, $x_m(t)$) picked up on the two channels in such a manner as to produce a succession of frames in a series of frequency bands;

applying an algorithm for calculating a speech-presence index of each channel;

selecting one of the two microphones by applying a decision rule to the successive frames of each of the channels, which rule is a function both of a channel selection criterion and of said speech-presence index, and eliminating, from the successive frames, frequency bands that are situated beneath a second given threshold; and implementing speech processing on the basis of the sound signal picked up by the one selected microphone;

which method is characterized in that:

said transformation of the signals ($x_n(t)$, $x_m(t)$) picked up on the two channels is a short-term Fourier transform;

said speech-presence index is a confidence index calculated for each frequency band of each frame; and said selection criterion is calculated in frequency bands on only those frequency bands for which the confidence index is greater than a first given threshold, wherein:

said multi-microphone speech processor system is a system having spaced-apart directional or non-directional microphones; and said channel selection criterion is an energy criterion based on comparing respective signal-to-noise ratio values of the signals picked up simultaneously on the two channels, the microphone for selection being the microphone for which the signal-to-noise ratio is greater than the other.

7. The method of claim 6, wherein the speech-presence confidence index is a probability that speech is present.

8. The method of claim 6, wherein the speech-presence confidence index is calculated for each frequency band, and said selection is performed providing the index is greater than a third given threshold, in a number of frequency bands that is greater than a fourth given threshold.

9. The method of claim 6, wherein the selection of one of the two microphones is performed conditionally only when said decision rule is satisfied on a number of successive frames that is greater than a fifth given threshold.

10. The method of claim 6, wherein, if it is decided to select one of the microphones, said selection is performed progressively over a given transition time lapse by applying increasing gain to the channel of the microphone that is to be selected and decreasing gain to the channel of the microphone that is to be deselected.

* * * * *